United States Patent
Renollett et al.

(10) Patent No.: US 11,333,254 B2
(45) Date of Patent: May 17, 2022

(54) CONTROL VALVES

(71) Applicant: TESCOM CORPORATION, Elk River, MN (US)

(72) Inventors: Jacob T. R. Renollett, Andover, MN (US); William J. Neubauer, Ramsey, MN (US); Keith Duwayne Monson, Ramsey, MN (US)

(73) Assignee: TESCOM CORPORATION, Elk River, MN (US)

( * ) Notice: Subject to any disclaimer, the term of this patent is extended or adjusted under 35 U.S.C. 154(b) by 194 days.

(21) Appl. No.: 16/702,125

(22) Filed: Dec. 3, 2019

(65) Prior Publication Data

US 2020/0182357 A1 Jun. 11, 2020

Related U.S. Application Data

(60) Provisional application No. 62/776,889, filed on Dec. 7, 2018.

(51) Int. Cl.
*F16K 1/12* (2006.01)
*F16K 31/122* (2006.01)
*F16K 1/38* (2006.01)

(52) U.S. Cl.
CPC .......... *F16K 1/126* (2013.01); *F16K 31/1221* (2013.01); *F16K 1/38* (2013.01);
(Continued)

(58) Field of Classification Search
CPC ........ F16K 1/126; F16K 31/1221; F16K 1/38; F16K 27/02; F16K 9/022; F16K 31/1262; F16K 27/0254; F16K 31/12; F16K 31/126; F16K 1/36; F16J 15/56; F16J 5/34; Y10T 137/87925; Y10T 137/87885
See application file for complete search history.

(56) References Cited

U.S. PATENT DOCUMENTS 2,783,020 A    2/1957  Kleczek
3,734,455 A *  5/1973  Natho .................. F16K 31/1221
                                                           251/62
(Continued)

FOREIGN PATENT DOCUMENTS

CN    103 925 404 A    7/2014
EP        2 078 890    7/2009
FR          923 980 A  7/1947

OTHER PUBLICATIONS

International Search Report and Written Opinion for PCT/US2019/064355, dated Feb. 27, 2020.

*Primary Examiner* — Craig M Schneider
*Assistant Examiner* — Frederick D Soski
(74) *Attorney, Agent, or Firm* — Marshall, Gerstein & Borun LLP

(57) ABSTRACT

An example control valve includes a split valve body. The split valve body includes a first body portion, a second body portion, a flow path, an inlet port, and an outlet port. The flow path passes through the first body portion and the second body portion. The first body portion is coupled to the second body portion. The control valve also includes a valve seat. The valve seat is disposed between the first body portion and the second body portion. The control valve also includes a valve plug. The valve plug is movable relative to the valve seat to control fluid flow through the control valve.

21 Claims, 7 Drawing Sheets

(52) U.S. Cl.
CPC .............. *Y10T 137/87885* (2015.04); *Y10T 137/87925* (2015.04)

(56) References Cited

U.S. PATENT DOCUMENTS

| | | | | |
|---|---|---|---|---|
| 4,418,535 | A * | 12/1983 | Ecomard | G05D 16/0655 60/602 |
| 4,836,243 | A * | 6/1989 | Ferrell | F16K 3/314 137/556 |
| 4,840,347 | A * | 6/1989 | Ariizumi | F16K 31/1221 251/63.4 |
| 4,944,215 | A * | 7/1990 | Nimmo | F15B 15/1433 277/505 |
| RE33,928 | E * | 5/1992 | Bruton | F16K 31/1262 12/94 |
| 5,375,623 | A * | 12/1994 | Weber | F16K 31/0693 137/454.5 |
| 5,443,083 | A * | 8/1995 | Gotthelf | G05D 16/0663 137/484.8 |
| 6,170,519 | B1 * | 1/2001 | Carroll | G05D 16/107 137/505.42 |
| 7,658,366 | B2 * | 2/2010 | Larsen | F16K 1/38 251/282 |
| 8,985,137 | B2 * | 3/2015 | Burgett | F16K 27/0281 137/315.28 |
| 10,488,872 | B2 * | 11/2019 | Koinke | F16K 31/1221 |
| 2001/0028049 | A1 * | 10/2001 | Mamyo | F16K 7/14 251/63.5 |
| 2002/0036017 | A1 * | 3/2002 | Leys | F16K 31/1262 137/625.66 |
| 2002/0139948 | A1 * | 10/2002 | Hademenos | F15B 15/1476 251/63.6 |
| 2004/0231734 | A1 * | 11/2004 | Larsen | F16K 17/003 137/613 |
| 2006/0197049 | A1 | 9/2006 | Hamada et al. | |
| 2006/0231142 | A1 * | 10/2006 | Schwartz | G05D 16/103 137/505.25 |
| 2007/0131294 | A1 * | 6/2007 | Zub | F15B 13/0814 137/884 |
| 2008/0054214 | A1 * | 3/2008 | Olberding | F16K 31/1262 251/242 |
| 2008/0290313 | A1 | 11/2008 | Larsen | |
| 2008/0308163 | A1 * | 12/2008 | Larsen | F16K 11/044 137/625.48 |
| 2010/0243084 | A1 * | 9/2010 | Yoshioka | F15B 13/024 137/529 |
| 2013/0168580 | A1 * | 7/2013 | Burgett | F16K 31/1225 251/14 |
| 2013/0193357 | A1 * | 8/2013 | Larsen | F16K 31/143 251/89 |
| 2013/0291954 | A1 * | 11/2013 | Young | F16K 31/1262 137/15.23 |
| 2013/0312840 | A1 * | 11/2013 | Young | F16K 31/1221 137/15.19 |
| 2013/0313451 | A1 * | 11/2013 | Young | F16K 31/1262 251/61.4 |
| 2014/0097364 | A1 * | 4/2014 | Young | F16K 31/1262 251/61 |
| 2014/0138564 | A1 * | 5/2014 | Adams | F15B 15/10 251/63.6 |
| 2014/0178239 | A1 * | 6/2014 | Asaoka | F04C 2/3441 418/260 |
| 2014/0183385 | A1 * | 7/2014 | Adams | F15B 15/1438 251/128 |
| 2014/0231682 | A1 | 8/2014 | Hirai | |
| 2014/0261813 | A1 * | 9/2014 | Brouwer | F16K 11/0743 137/625.46 |
| 2015/0020759 | A1 * | 1/2015 | Watanabe | F01L 1/3442 123/90.15 |
| 2015/0204456 | A1 * | 7/2015 | Adams | F16K 31/1221 251/63.6 |
| 2015/0205306 | A1 * | 7/2015 | Schmitz | F16K 31/1221 137/505.41 |
| 2015/0247429 | A1 * | 9/2015 | Hase | F01L 1/356 123/90.17 |
| 2016/0102765 | A1 * | 4/2016 | McEvoy | F15B 15/1438 137/15.18 |
| 2016/0123491 | A1 * | 5/2016 | Chiba | F16K 31/1226 156/345.24 |
| 2016/0153578 | A1 * | 6/2016 | Landrith, II | F16K 31/1221 137/625.48 |
| 2016/0290519 | A1 * | 10/2016 | Burgett | G05D 7/0126 |
| 2017/0009785 | A1 * | 1/2017 | McEvoy | F15B 15/1433 |
| 2017/0102087 | A1 * | 4/2017 | Burgett | G05D 16/185 |
| 2017/0321819 | A1 * | 11/2017 | Howell | F16K 7/17 |
| 2018/0023725 | A1 * | 1/2018 | McEvoy | F15B 15/2807 251/63.6 |

\* cited by examiner

CONTROL VALVES

FIELD OF THE DISCLOSURE

The present patent relates generally to control valves and, in particular, to control valves for use in cold-weather applications including a split valve bodies.

BACKGROUND

Control valves are sometimes used in cold-weather applications. Some of these cold-weather applications include controlling flow of hydrogen at hydrogen filling stations.

SUMMARY

In accordance with a first example, a control valve includes a split valve body. The split valve body includes a first body portion, a second body portion, an inlet port, an outlet port, and an input port. The first body portion includes a first bore. The second body includes a second bore and a chamber. The first bore, the second bore, and the chamber being coaxial. The control valve also includes a valve seat and a valve plug. The valve plug is movable relative to the valve seat to control fluid flow between the inlet port and the outlet port. The control valve also includes a valve stem. The valve stem is coupled to the valve plug. The control valve also includes a spring. The spring is positioned within the chamber. The control valve also includes a piston. The piston is movable within the chamber. The piston is coupled to the valve stem. In response to an input received at the input port, the piston compresses the spring and moves the valve plug between a closed position and an open position.

In accordance with a second example, a control valve includes a split valve body. The split valve body includes a first body portion, a second body portion, a flow path, an inlet port, and an outlet port. The flow path passing through the first body portion and the second body portion. The first body portion is coupled to the second body portion. The control valve also includes a valve seat. The valve seat is disposed between the first body portion and the second body portion. The control valve also includes a valve plug. The valve plug is movable relative to the valve seat to control fluid flow through the control valve.

In accordance with a third example, a control valve includes a split valve body. The split valve body includes a first body portion and a second body portion, an inlet port, an outlet port, and a flow path. The flow path is disposed between the inlet port and the outlet port. The first body portion includes a first bore. The second body portion includes a second bore. The control valve includes a valve seat and a valve plug. The valve plug includes a first portion and a second portion. The valve plug is movable relative to the valve seat to control fluid flow between the inlet port and the outlet port. The valve plug includes a first seal. The first seal sealingly engages the first portion of the valve plug. The valve plug also includes a second seal. The second seal sealingly engaging the second portion of the valve plug.

In further accordance with the foregoing first, second and/or third examples, an apparatus and/or method may further include any one or more of the following:

In accordance with one example, further including a first seal and a second seal. The first seal is received within the first bore. The second seal is received within the second bore. The plug includes a first portion and a second portion. The first seal sealing engages the first portion of the plug. The second seal sealingly engages the second portion of the plug.

In accordance with another example, the valve plug includes a first retainer and a second retainer. The first retainer is to retain the first seal within the first bore. The second retainer is to retain the second seal within the second bore.

In accordance with another example, a flow path of the split valve body includes a first flow path portion and a second flow path portion. The first flow path portion passes through the first body portion. The second flow path portion passes through the second body portion. The control valve further includes a seal. The seal is disposed at an interface between the first flow path portion and the second flow path portion.

In accordance with another example, the first body portion and the second body portion include opposing apertures. The control valve further includes a locator pin. The locator pin is received within the opposing apertures.

In accordance with another example, the control valve further includes a diaphragm. The diaphragm covers the chamber. The diaphragm acts on the piston in response to the input being received.

In accordance with another example, the second body portion includes a threaded end, a step, and a cap. The cap threadably engages the threaded end. The diaphragm includes a peripheral edge, the peripheral edge being disposed between the step and the cap.

In accordance with another example, the first body portion includes a first bore. The second body portion includes a second bore. The control valve further includes a first seal and a second seal. The first seal is positioned within the first bore. The second seal is positioned within the second bore. The first seal sealing engages the valve plug. The second seal sealing engages the valve plug.

In accordance with another example, the first seal is a first spring-energized seal and the second seal is a second spring-energized seal.

In accordance with another example, the second body portion further includes a chamber. The chamber includes a first portion and a second portion. The control valve further includes a spring. The spring is disposed in the first portion of the chamber. The control valve also includes a spring seat. The control valve also includes a valve stem. The valve stem is coupled to the valve plug and the spring seat. The spring is captured in the first portion of the chamber via the spring seat.

In accordance with another example, the control valve further includes a piston. The piston acts on the spring seat. The piston is movable within the second portion of the chamber in response to an input that causes the control valve to actuate between an open position and a closed position.

In accordance with another example, the second body portion further includes an input port. The input port receives the input that causes the control valve to actuate between the open position and the closed position.

In accordance with another example, the second body portion further includes a step and an opening. The step is positioned between the second portion of the chamber and the opening of the second body portion. The control valve further includes a cap and a diaphragm. The cap includes the input port. The cap is coupled to the second body portion at the opening. The diaphragm is captured between the cap and the step. The diaphragm extends over the second portion of the chamber. The diaphragm acts on the piston to actuate the control valve in response to the input.

In accordance with another example, the second body portion is coupled to the first body portion via fasteners. The fasteners extend through the first body portion and threadably engage the second body portion.

In accordance with another example, the split valve body includes a first groove and a second groove. The first groove and the second groove are coaxial relative to one another. The valve seat is positioned within the first groove. The control valve further includes a support. The support is received within the second groove.

In accordance with another example, the second body portion includes a collar. The first body portion includes a recess. The collar is received within the recess.

In accordance with another example, the second body portion includes a chamber and a threaded opening. The chamber includes a first portion and a second portion. At least two or more of the first bore, the second bore, the chamber, and the threaded opening are coaxial.

In accordance with another example, further including a valve stem. The valve stem is coupled to the valve plug. The control valve also includes a spring. The spring is positioned within the first portion of the chamber. The control valve also includes a spring seat. The spring seat is coupled to the valve stem. The spring is captured within the first portion of the chamber via the spring seat. The control valve includes a piston. The piston is movable within the second portion of the chamber. The piston engages the spring seat. Movement of the piston moves the spring seat. The control valve further includes a diaphragm. The diaphragm covers the second portion of the chamber. The control valve also includes a cap. The cap includes an input port. The cap threadably engages the threaded opening of the second body portion. In response to an input received at the input port, the diaphragm acts on the piston and moves the valve plug between a closed position and an open position.

In accordance with another example, the first body portion and the second body portion include opposing apertures. The control valve further includes a locator pin. The locator pin is received within the opposing apertures.

DETAILED DESCRIPTION

Although the following text discloses a detailed description of example methods, apparatus and/or articles of manufacture, it should be understood that the legal scope of the property right is defined by the words of the claims set forth at the end of this patent. Accordingly, the following detailed description is to be construed as examples only and does not describe every possible example, as describing every possible example would be impractical, if not impossible. Numerous alternative examples could be implemented, using either current technology or technology developed after the filing date of this patent. It is envisioned that such alternative examples would still fall within the scope of the claims.

Figure 1:
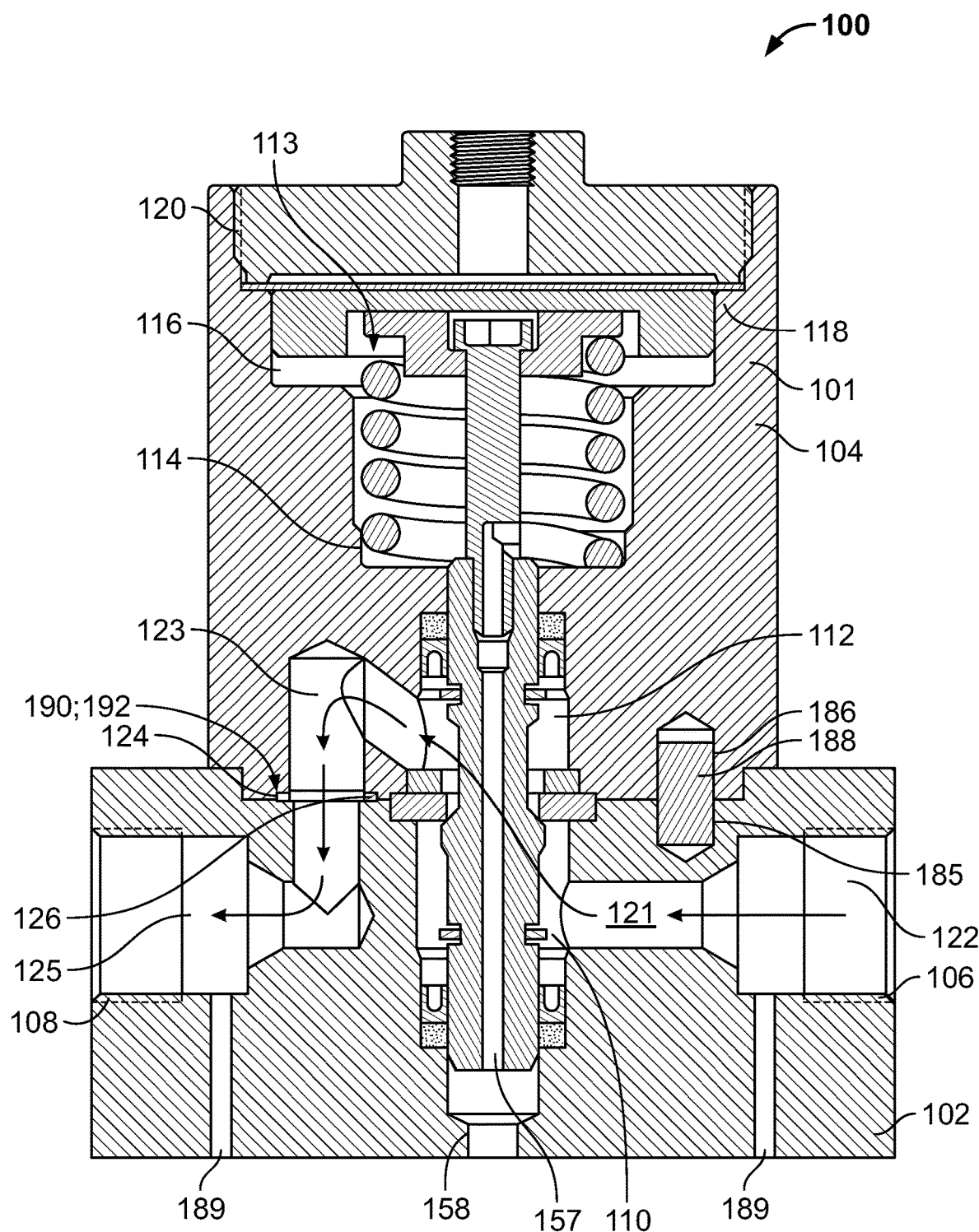
FIG. 1 illustrates a cross-sectional view of an example control valve in accordance with the teachings of this disclosure.

Referring now to the drawings, FIG. 1 illustrates a control valve (a split-body valve) 100 assembled in accordance with a first disclosed example of the present invention. In accordance with the disclosed example, the control valve 100 includes split valve body 101. The split valve body 101 includes a lower body portion (e.g., a first body portion) 102 and an upper body portion (e.g., a second body portion) 104. The lower body portion 102 is coupled to the upper body portion 104.

The lower body portion 102 includes an inlet port 106, an outlet port 108, and a first bore 110. In other examples, the inlet port 106 and/or the outlet port 108 are defined by the upper body portion 104. The upper body portion 104 includes a second bore 112 and a chamber 113. The chamber 113 includes a first portion (a spring chamber) 114 and a second portion (a piston chamber) 116. The upper body portion 104 also includes a step 118 and a threaded opening 120. The first bore 110, the second bore 112, the first portion 114 of the chamber 113, the second portion 116 of the chamber 113, and the threaded opening 120 are coaxial.

The split valve body 101 includes a flow path 121. The flow path 121 includes a flow path portion 122, a flow path portion 123, and a flow path portion 125. The flow path portions 122, 123 meet at an interface and the flow path portions 123, 125 meet at an interface(s). The flow path portion 122 passes through the first body portion 102. The flow path portion 123 passes through the second body portion 104. The flow path 121 fluidly couples the inlet port 106 and the outlet port 108 of the lower body portion 102. In the illustrated example, the flow path portion 123 is angled at approximately 45° relative to a transverse axis of the control valve 100. However, the flow path portion 123 can have a different contour (See FIG. 6).

The upper body portion 104 includes a groove 124. The groove 124 surrounds the flow path 121 and receives a seal 126. The seal 126 is disposed at the interface between the flow path portion 123 and the flow path portion 125. The seal 126 prevents fluid from exiting the control valve 100 at the interface. In this example, the seal 126 is a plastic seal that is operable in colder temperatures. However, the seal 126 can be any other type of seal that is made of any other type of material.

Figure 2:
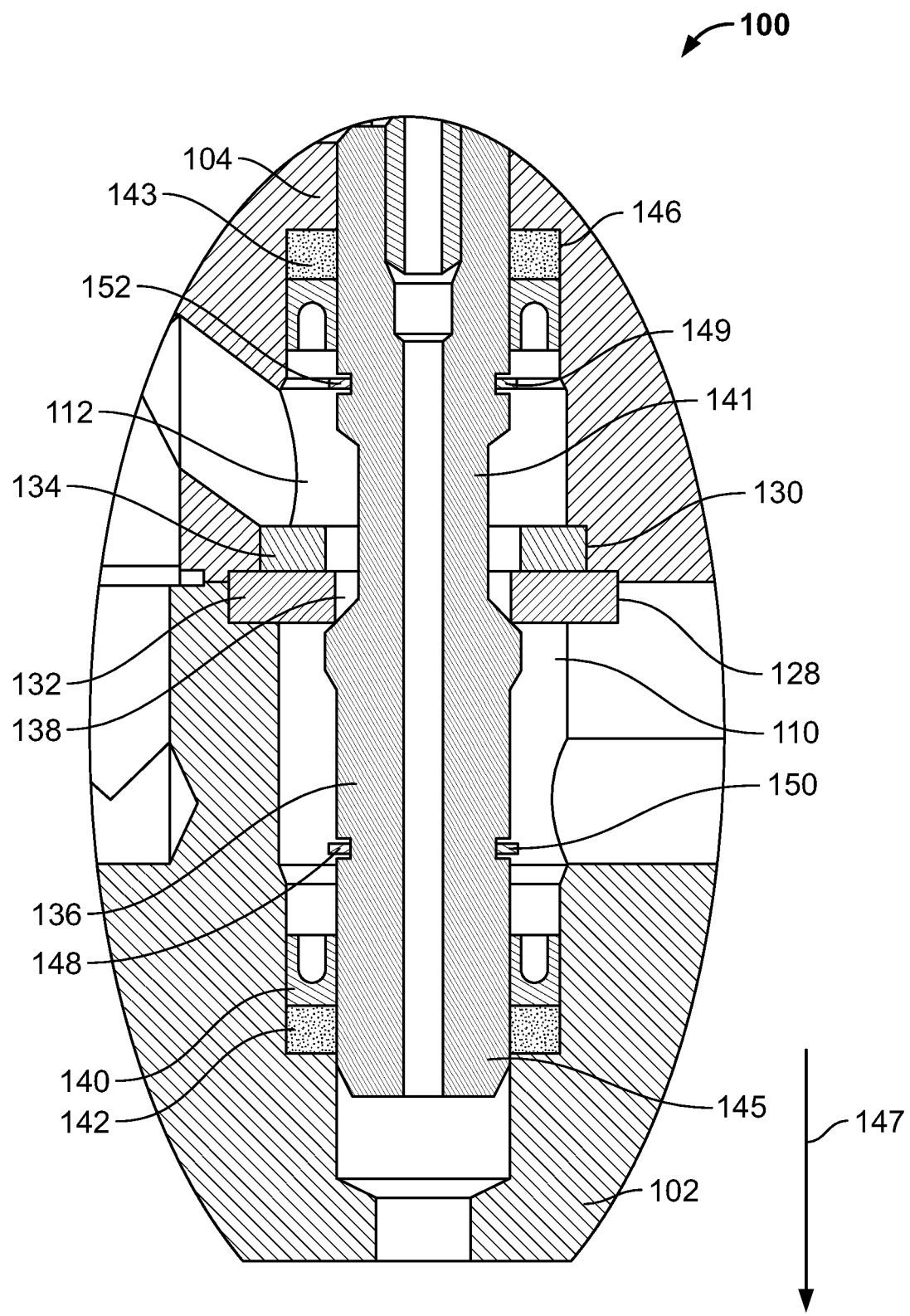
FIG. 2 illustrates a first detailed view of the control valve of FIG. 1.

Referring to FIG. 2, a detailed view of the control valve 100 of FIG. 1 is shown. The lower body portion 102 includes a groove 128 and the upper body portion 104 includes a groove 130. The grooves 128, 130 are coaxial. A valve seat 132 is positioned within the groove 128 between the lower body portion 102 and the upper body portion 104. In some examples, the valve seat 132 is also partially received within a corresponding groove of the upper body portion 104. Alternatively, the valve seat 132 can be fully received within the lower body 102 or fully received within the upper body portion 104. A support 134 is positioned with the groove 130. In this example, the support 134 is a metal support. However, the support 134 may be made of any other type of material.

The control valve 100 also includes a valve plug 136. The valve plug 136 is movable within the first and second bores 110, 112 and relative to the valve seat 132 to control fluid flow between the inlet port 106 and the outlet port 108. The support 134 supports the valve seat 132 and deters the valve seat 132 from deflecting, for example, when the valve plug 136 sealingly engages against an orifice 138 of the valve seat 132.

The control valve 100 also includes a first seal 140 disposed at a first end 142 of the first bore 110. The control valve 100 also includes a second seal 143 disposed at a second end 146 of the second bore 112. In this example, the first and second seals 140, 143 are spring-energized seals that are operable in colder temperatures. However, the first and second seals 140, 143 can be any other type of seal.

The valve plug 136 includes a first portion 145 and a second portion 141. The first portion 145 of the valve plug 136 is positioned opposite the second portion 141 of the valve plug 136. The first seal 140 sealingly engages the first portion 145 of the valve plug 136 to prevent fluid from exiting the first bore 110 in a direction generally indicated by arrow 147. The second seal 143 sealingly engages the second portion 141 of the valve plug 136 to prevent fluid from exiting the second bore 112 in a direction generally opposite that indicated by arrow 147.

The first portion 145 of the valve plug 136 includes a retaining-ring groove 148 and the second portion 141 of the valve plug 136 includes a retaining-ring groove 149. A first retaining ring (a first retainer) 150 is received within the retaining-ring groove 148 and a second retaining ring (a second retainer) 152 is received within the retaining-ring groove 149. The retaining rings 150, 152 are carried by the valve plug 136 and act as stops that prevent the seals 140, 143 from moving out of the respective bores 110, 112.

Figure 3:
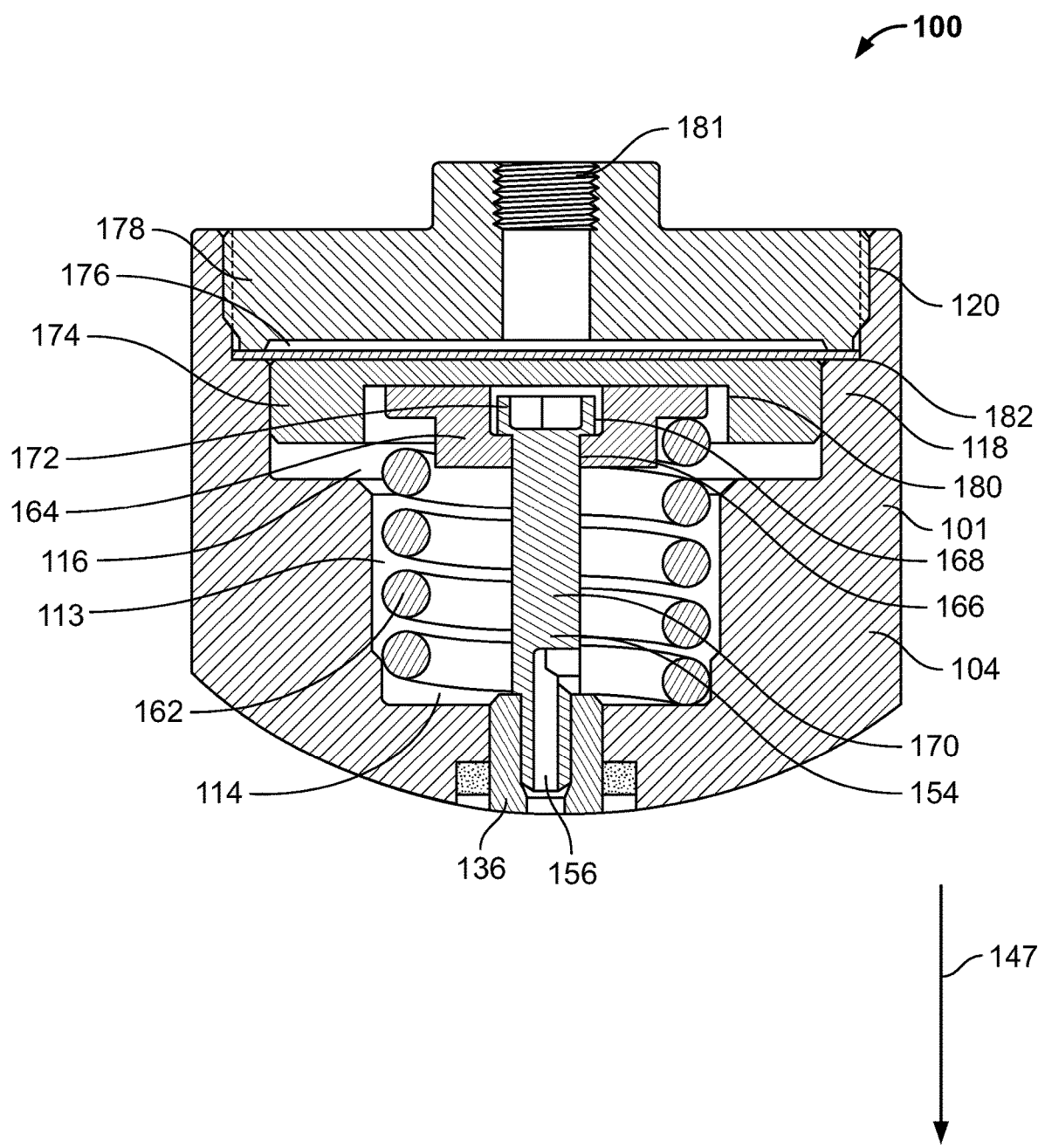
FIG. 3 illustrates a second detailed view of the control valve of FIG. 1.

Referring to FIG. 3, another detailed view of the control valve 100 of FIG. 1 is shown. The control valve 100 includes a valve stem 154. The valve stem 154 is coupled to the valve plug 136 via a threaded connection. In this example, the valve stem 154 includes a flow path 156 and the valve plug 136 includes a flow path 157 (FIG. 1). The flow paths 156, 157 are fluidly coupled. Further, the flow paths 156, 157 fluidly couple the first portion 114 of the chamber 113 to a second port 158 (FIG. 1) of the lower body portion 102. As a result, any fluid that passes by the second seal 143 (FIG. 2) and enters the first portion 114 of the chamber 113 can exit the control valve 100 in a controlled manner via the second port 158 (FIG. 1).

The control valve 100 also includes a spring 162 and a spring seat 164. The spring seat 162 includes an aperture 166 and a recess 168. The valve stem 154 includes a body 170 and a head 172. The head 172 of the valve stem 154 has a larger diameter than the body 170 of the valve stem 154. To couple the spring seat 164 to the valve stem 154, the body 170 of the valve stem 154 extends through the aperture 166 of the spring seat 164 and the head 172 of the valve stem 154 is captured within the recess 168 of the spring seat 164. The spring 162 is positioned within the first portion 114 of the chamber 113 of the upper body portion 104. The spring 162 is captured within the first portion 114 of the chamber 113 via the spring seat 164.

The control valve 100 also includes a piston 174, a diaphragm 176, and a cap 178. The piston 174 is movable within the second portion 116 of the chamber 113. The piston 174 includes a recess 180 that receives the spring seat 164. The piston 174 acts on the spring seat 164 such that movement of the piston 174 correspondingly moves the spring seat 164. Conversely, the spring seat 164 acts on the piston 174 such that movement of the spring seat 164, via the spring 162, correspondingly moves the piston 174.

The diaphragm 176 includes a peripheral edge 182 that is disposed adjacent the step 118. The peripheral edge 182 of the diaphragm 176 is captured between the step 118 and the cap 178. An interaction between the peripheral edge 182 of the diaphragm 176, the step 118, and the cap 178 secures the diaphragm 176 in place. A remainder of the diaphragm 176 extends across the second portion 116 of the chamber 113.

The cap 178 threadably engages the threaded opening 120 of the upper body portion 104. The interaction between the cap 178 and the threaded opening 120 couples the cap 178 to the upper body portion 104. In other examples, the cap 178 can be coupled to the upper body portion 104 in different ways. For example, fasteners can be used to couple the cap 178 and the upper body portion 104. The cap 178 includes a threaded port 181. To actuate the control valve 100 between a closed position and an open position, an input (e.g., a pneumatic input) is received through the port 181. The input acts on the diaphragm 176 and urges the diaphragm 176 against the piston 174. As a result, the diaphragm 176 and the piston 174 move against a force of the spring 162 in the direction generally indicated by arrow 147 to actuate the control valve 100 between a closed position shown in FIG. 1 and an open position shown in FIG. 4.

Referring back to FIG. 1, the first body portion 102 and the second body portion 104 include opposing apertures 185, 186. A locator pin 188 is received within the apertures 185, 186. The locator pin 188 ensures the rotational position of the lower body portion 102 relative to the upper body portion 104 and, thus, ensures that openings 190, 192 of the respective flow path portions 123, 125 align. In this example, the apertures 185, 186 are located approximately 180° from the interface between the flow path 121 and the outlet port 108.

The lower body portion 102 includes apertures 189 that couple the ports 106, 108 to the environment. The apertures 189 enable at least one of pressure or condensation to exit the control valve 100 without adversely affecting the connection at the respective ports 106, 108.

Figure 4:
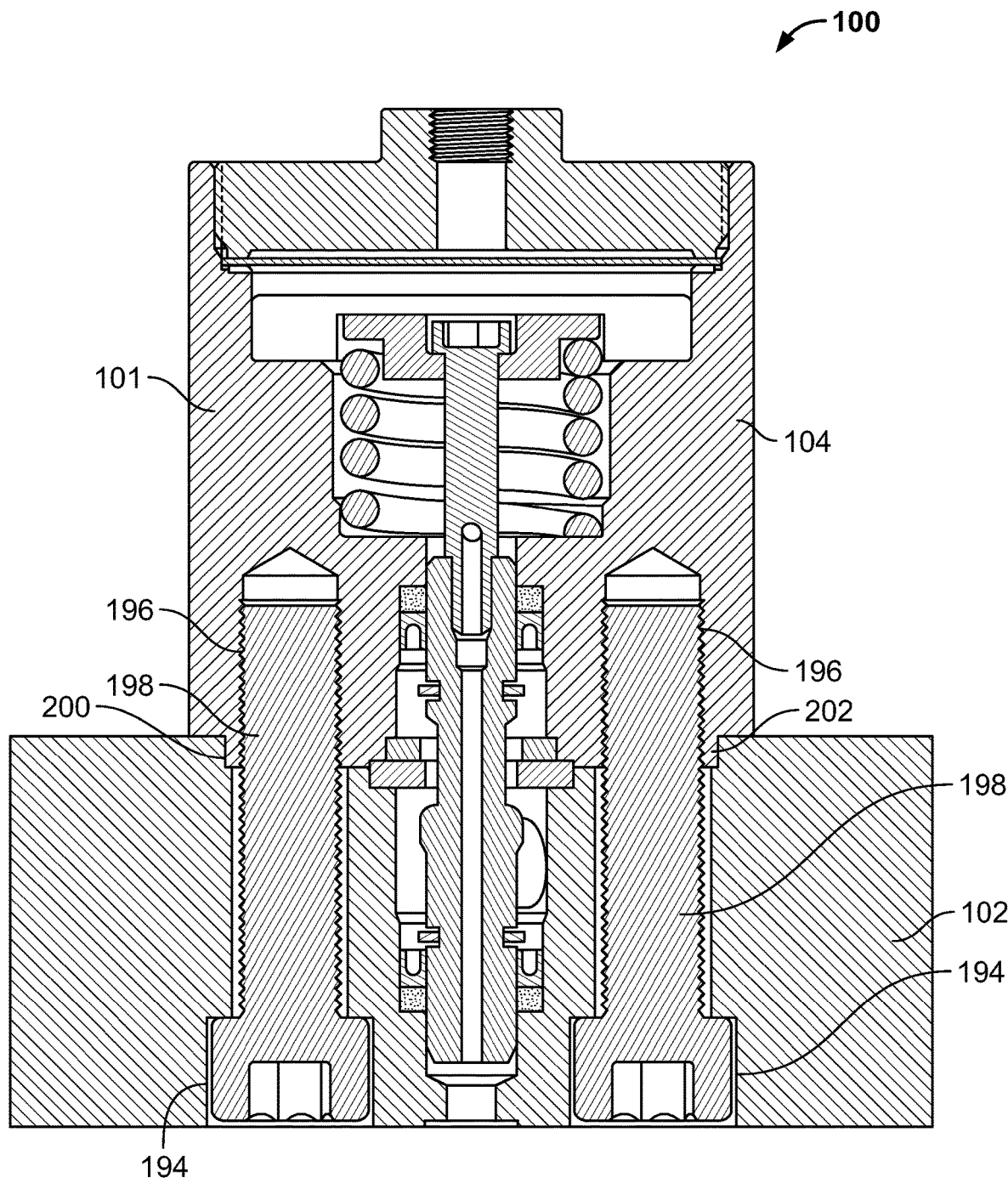
FIG. 4 illustrates another cross-sectional view of the control valve of FIG. 1.

Referring to FIG. 4, another cross-sectional view of the control valve 100 of FIG. 1 is shown. The lower body portion 102 includes first apertures 194 and the upper body portion 104 includes second apertures 196. Fasteners 198 extend through the lower body portion 102 and threadably engage the upper body portion 104. The interaction between the fasteners 198, the lower body portion 102, and the upper body portion 104 couples the lower body portion 102 and the upper body portion 104 together. The control valve 100 includes four of the first apertures 194, four of the second apertures 196, and four of the fasteners 198. However, in other examples, the control valve 100 can include any other number of apertures 194, 196 and corresponding fasteners 198. Alternatively, the lower body portion 102 and the upper body portion 104 can be coupled in different ways. For example, the lower body portion 102 can be threadably coupled to the upper body portion 104 or the lower body portion 102 and the upper body portion 104 can be coupled using a snap ring.

The lower body portion 102 includes a recess 200 and the upper body includes a collar 202. The collar 202 is received within the recess 200. An interaction between the collar 202 and the recess 200 further assists in locating the components of the lower body portion 102 relative to the components of the upper body portion 104 and/or further assists in providing a secure connection between the lower body portion 102 and the upper body portion 104.

Figure 5:
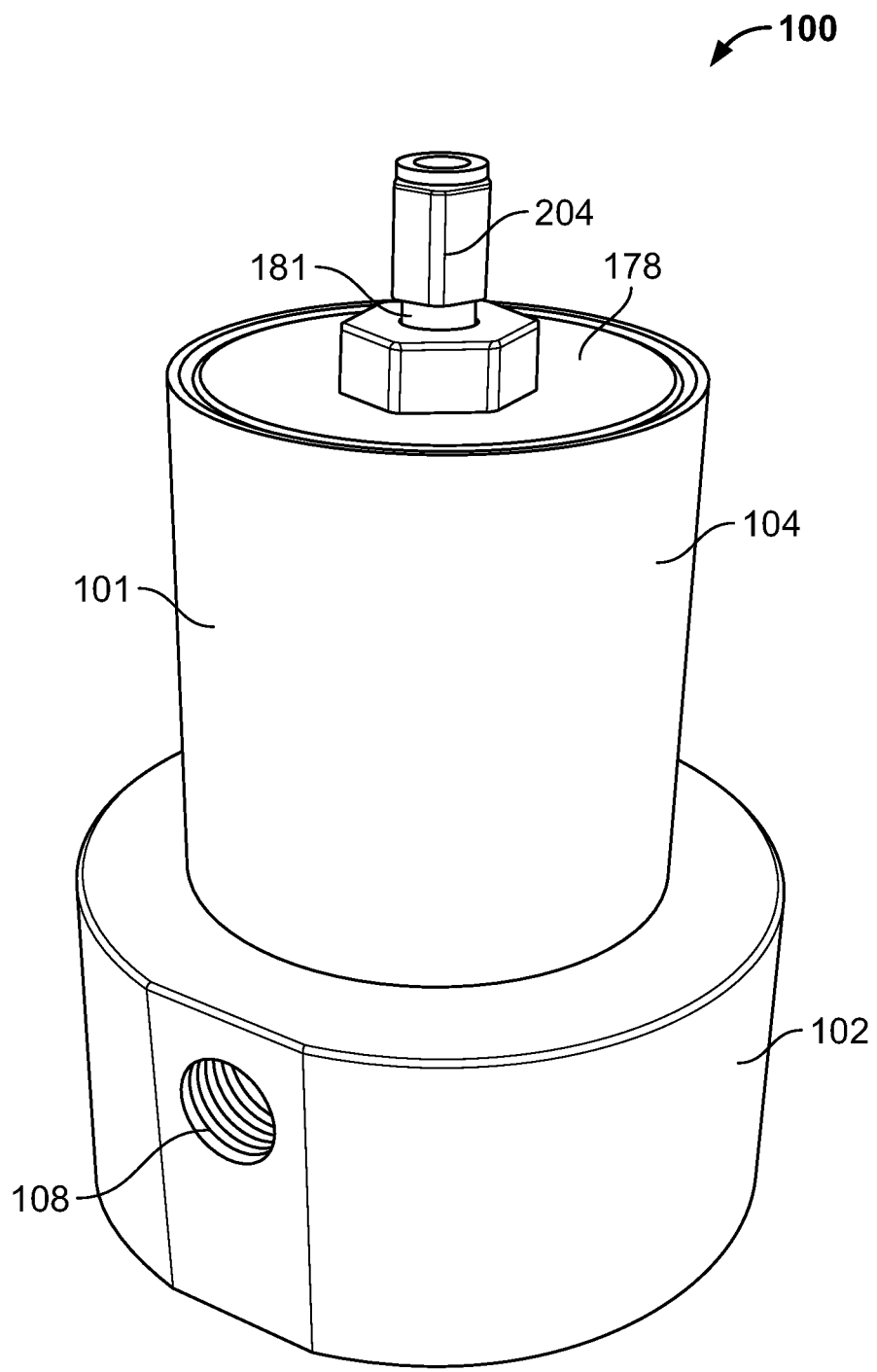
FIG. 5 illustrates an isometric view of the control valve of FIG. 1.

Referring to FIG. 5, an isometric view of the control valve 100 of FIG. 1 is shown. The control valve 100 includes a coupling 204. The coupling 204 threadably engages the port 181.

Figure 6:
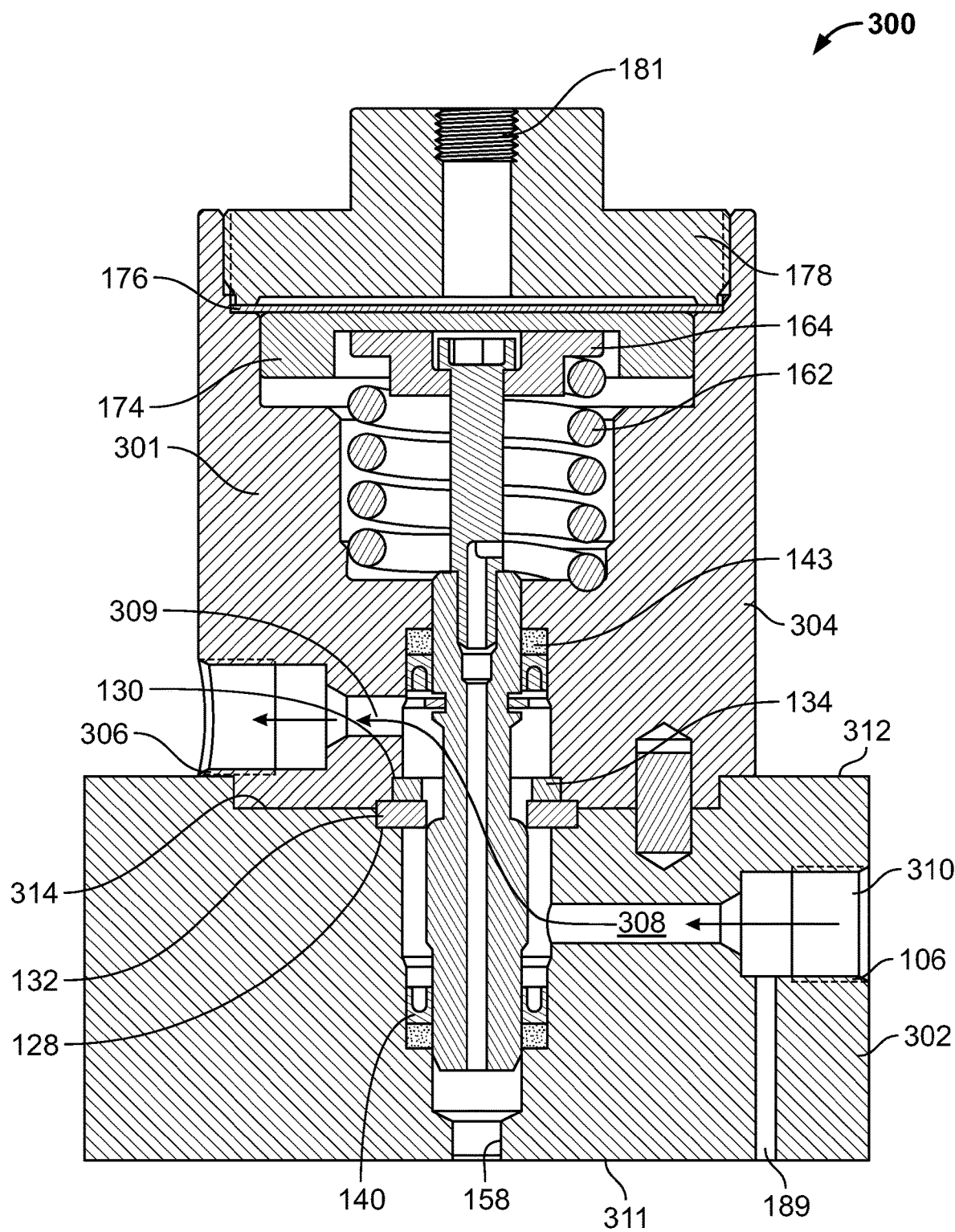
FIG. 6 illustrates a cross-sectional view of another example control valve in accordance with the teachings of this disclosure.

Referring to FIG. 6, another control valve 300 assembled in accordance with a second disclosed example of the present invention is shown. The control valve 300 is similar to the control valve 100 of FIG. 1. The control valve 300 includes a split valve body 301. The split valve body 301 includes a lower body portion 302 and an upper body portion 304, where the lower body portion 302 includes the inlet port 106 and the upper body portion 304 includes an outlet port 306 (not the lower body portion 302). Thus, the outlet port 306 of the control valve 300 of FIG. 6 is "off-axis" relative to the inlet port 106.

The split valve body 301 includes a flow path 308 between the inlet port 106 and the outlet port 108. The flow path 308 includes a first flow path portion 309 and a second flow path portion 310. The second flow path portion 310 is coupled to the outlet port 306 and is coaxial with the outlet port 306.

The lower body portion 302 includes a first surface 311 and a second surface 312. The first surface 311 is opposite the second surface 312. As shown, the second surface 312 forms the groove 128 that receives the valve seat 132. The upper body portion 304 includes a third surface 314 that faces the second surface 312. As shown, the third surface 314 forms the groove 130 that receives the support 134. Of course, one or more of the grooves 128, 130 can be formed partially or fully by the lower body portion 302 or the upper body 304.

Figure 7:
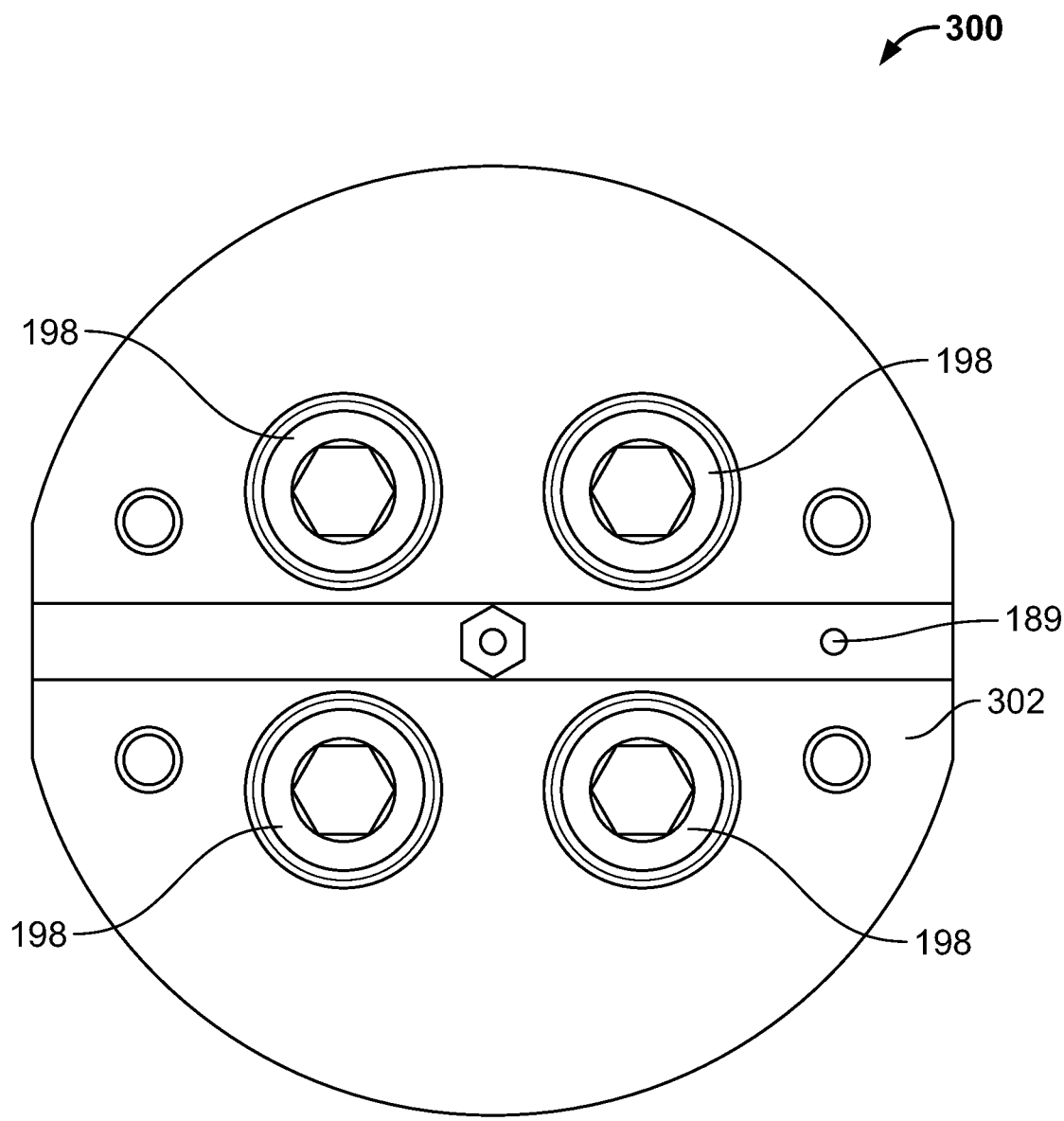
FIG. 7 illustrates a bottom view of the control valve of FIG. 6.

Referring to FIG. 7, a bottom view of the lower body portion 302 is shown. The fasteners 198 extend through the lower body portion 302 and threadably engage the upper body portion 304 to couple the body portions 302, 304 together.

From the foregoing, it will be appreciated that the above disclosed apparatus, methods and articles of manufacture increase the ability of the example control valves to be used in colder temperatures (e.g., −400° F.) such as those associated with hydrogen filling stations. Specifically, the example control valves can be used in environments where standard polymer O-rings may fail. The example control valves are split body valves/manifold split valves having a lower body (e.g., a body) and an upper body (e.g., a second body). The lower and upper bodies are manifolded together using bolts where the seat is located. Thus, the seat is disposed between the first and second body portions. Alternatively, the lower and upper body portions can be coupled in different ways. For example, the lower and upper bodies can be coupled together with threads or using a snap ring.

The example control valves are compact while still enabling relatively high flow therethrough and relatively high pressure therethrough. Moreover, the example control valves have a reduced number of components as compared to known control valves and have a reduced number of potential leakage points as compared to known control valves. For example, the upper body of the disclosed control valves is formed of a single part including a bonnet, an insert, and an actuator. Thus, as compared to some known control valves, the example control valves combine at least three parts into one.

By producing the example control valves as a split body valve having first and second body portions, higher surface finish quality is achievable by enabling access to areas without using tools (e.g., boring bar) having a longer length. For example, access to bores of the split body is increased enabling a higher quality surface finish to be achieved within the bores. With higher surface finish quality, seals that are operable in colder temperatures can be used. Without the higher surface finish quality provided by the examples disclosed herein, burrs or imperfections in the surface finish would be present that tend to damage or otherwise reduce the useful life of these cold-temperature seals. Some cold-temperature seals that can be used to implement the examples disclosed herein are spring-energized seals that may be referred to as "soft seals." Moreover, by producing the example control valves as a split body valve having first and second body portions, the concentricity of the mating components is improved and the boundary components of the control valve are condensed. In other words, the components of the valve fit together better and a size of the dimensional envelope is reduced.

Further, while several examples have been disclosed herein, any features from any examples may be combined with or replaced by other features from other examples. Moreover, while several examples have been disclosed herein, changes may be made to the disclosed examples within departing from the scope of the claims.

What is claimed is:

1. A control valve, comprising:
   a split valve body, the split valve body including a first body portion, a second body portion, an inlet port, an outlet port, and an input port, the first body portion including a first bore, the second body portion including a second bore and a chamber separate from the second bore, the first bore, the second bore, and the chamber being coaxial;
   a valve seat;
   a valve plug, the valve plug being movable within the second bore and relative to the valve seat to control fluid flow between the inlet port and the outlet port;
   a valve stem, the valve stem being coupled to the valve plug;
   a spring, the spring being positioned within the chamber;
   a spring seat disposed in the chamber;
   a piston, the piston being movable within the chamber, the piston being coupled to the valve stem;
   wherein, in response to an input received at the input port, the piston compresses the spring via the spring seat and moves the valve plug between a closed position and an open position,
   wherein a flow path of the split valve body includes a first flow path portion and a second flow path portion, the first flow path portion passes through the first body portion, the second flow path portion passes through the second body portion, and
   wherein the valve stem includes a third flow path portion and the valve plug includes a fourth flow path portion fluidly coupled to the third flow path portion which evacuates the chamber.

2. The control valve of claim 1, further including a first seal and a second seal, the first seal being received within the first bore, the second seal being received within the second bore, the plug including a first portion and a second portion, the first seal sealing engaging the first portion of the plug, the second seal sealingly engaging the second portion of the plug.

3. The control valve of claim 2, wherein the valve plug includes a first retainer and a second retainer, the first retainer is to retain the first seal within the first bore, the second retainer is to retain the second seal within the second bore.

4. The control valve of claim 1, further including a diaphragm, the diaphragm covering the chamber, and wherein the diaphragm acts on the piston in response to the input being received.

5. The control valve of claim 4, wherein the second body portion includes a threaded end, a step, and a cap, the cap threadably engaging the threaded end, the diaphragm including a peripheral edge, the peripheral edge being disposed between the step and the cap.

6. The control valve of claim 1, further including a seal, the seal being disposed at an interface between the first flow path portion and the second flow path portion.

7. The control valve of claim 1, wherein the first body portion and the second body portion include opposing apertures, further including a locator pin, the locator pin being received within the opposing apertures.

8. The control valve of claim 1, wherein the second body portion is coupled to the first body portion via fasteners, the fasteners extending through first apertures formed in the first body portion, respectively, and second apertures formed in the second body portion, respectively, and wherein the first body portion and the second body portion include opposing third apertures, the control valve further including a locator pin being received within the opposing third apertures.

9. A control valve, comprising:
a split valve body, the split valve body including a first body portion, a second body portion, a flow path, an inlet port, and an outlet port, the flow path passing through the first body portion and the second body portion, the first body portion being coupled to the second body portion;
a valve seat, the valve seat being disposed between the first body portion and the second body portion; and
a valve plug, the valve plug being movable relative to the valve seat to control fluid flow through the control valve,
wherein the split valve body includes a first groove and a second groove, the first groove and the second groove being coaxial relative to one another, the valve seat is positioned within the first groove, and wherein the control valve further includes a support, the support being received within the second groove.

10. The control valve of claim 9, wherein the first body portion includes a first bore, the second body portion includes a second bore, further including a first seal and a second seal, the first seal being positioned within the first bore, the second seal being positioned within the second bore, the first seal sealing engaging the valve plug, and the second seal sealing engaging the valve plug.

11. The control valve of claim 10, wherein the first seal is a first spring-energized seal and the second seal is a second spring-energized seal.

12. The control valve of claim 9, wherein the second body portion further includes a chamber, the chamber including a first portion and a second portion, and wherein the control valve further includes:
a spring, the spring being disposed in the first portion of the chamber;
a spring seat; and
a valve stem, the valve stem being coupled to the valve plug and the spring seat, the spring being captured in the first portion of the chamber via the spring seat.

13. The control valve of claim 12, and wherein the control valve further includes a piston, the piston acts on the spring seat, the piston being movable within the second portion of the chamber in response to an input that causes the control valve to actuate between an open position and a closed position.

14. The control valve of claim 13, wherein the second body portion further includes an input port, wherein the input port receives the input that causes the control valve to actuate between the open position and the closed position.

15. The control valve of claim 9, wherein the second body portion is coupled to the first body portion via fasteners, the fasteners extending through the first body portion and threadably engaging the second body portion.

16. The control valve of claim 9, wherein the second body portion includes a collar, the first body portion including a recess, the collar being received within the recess.

17. The control valve of claim 9, wherein the second body portion includes a chamber and a threaded opening, the chamber including a first portion and a second portion, at least two or more of the first bore, the second bore, the chamber, and the threaded opening are coaxial.

18. The control valve of claim 9, wherein the first body portion and the second body portion include opposing apertures, and wherein the control valve further includes a locator pin, the locator pin being received within the opposing apertures.

19. A control valve, comprising:
a split valve body, the split valve body including a first body portion, a second body portion, a flow path, an inlet port, and an outlet port, the flow path passing through the first body portion and the second body portion, the first body portion being coupled to the second body portion;
a valve seat, the valve seat being disposed between the first body portion and the second body portion; and
a valve plug, the valve plug being movable relative to the valve seat to control fluid flow through the control valve,
wherein the second body portion further includes a chamber, the chamber including a first portion and a second portion, and wherein the control valve further includes:
a spring, the spring being disposed in the first portion of the chamber;
a spring seat; and
a valve stem, the valve stem being coupled to the valve plug and the spring seat, the spring being captured in the first portion of the chamber via the spring seat,
wherein the control valve further includes a piston, the piston acts on the spring seat, the piston being movable within the second portion of the chamber in response to an input that causes the control valve to actuate between an open position and a closed position
wherein the second body portion further includes an input port, wherein the input port receives the input that causes the control valve to actuate between the open position and the closed position, and
wherein the second body portion further includes a step and an opening, the step being positioned between the second portion of the chamber and the opening of the second body portion, and wherein the control valve further includes a cap and a diaphragm, the cap includes the input port, the cap being coupled to the second body portion at the opening, the diaphragm being captured between the cap and the step, the diaphragm extending over the second portion of the chamber, the diaphragm acting on the piston to actuate the control valve in response to the input.

20. A control valve, comprising:
a split valve body, the split valve body including a first body portion and a second body portion, an inlet port, an outlet port, and a flow path, the flow path being disposed between the inlet port and the outlet port; the first body portion including a first bore, the second body portion including a second bore;

a valve seat;

a valve plug, the valve plug including a first portion and a second portion, the valve plug being movable relative to the valve seat to control fluid flow between the inlet port and the outlet port;

a first seal, the first seal sealingly engaging the first portion of the valve plug; and a second seal, the second seal sealingly engaging the second portion of the valve plug, wherein the second body portion includes a chamber and a threaded opening, the chamber including a first portion and a second portion, at least two or more of the first bore, the second bore, the chamber, and the threaded opening are coaxial, the control valve further including:

a valve stem, the valve stem being coupled to the valve plug;

a spring, the spring being positioned within the first portion of the chamber;

a spring seat, the spring seat being coupled to the valve stem, the spring being captured within the first portion of the chamber via the spring seat;

a piston, the piston being movable within the second portion of the chamber, the piston engaging the spring seat, wherein movement of the piston moves the spring seat;

a diaphragm, the diaphragm covering the second portion of the chamber; and a cap, the cap including an input port, the cap threadably engaging the threaded opening of the second body portion, wherein, in response to an input received at the input port, the diaphragm acts on the piston and moves the valve plug between a closed position and an open position.

21. A control valve, comprising:

a split valve body, the split valve body including a first body portion, a second body portion, an inlet port, an outlet port, and an input port, the first body portion including a first bore, the second body portion including a second bore and a chamber, the first bore, the second bore, and the chamber being coaxial;

a valve seat;

a valve plug, the valve plug being movable relative to the valve seat to control fluid flow between the inlet port and the outlet port;

a valve stem, the valve stem being coupled to the valve plug;

a spring, the spring being positioned within the chamber;

a piston, the piston being movable within the chamber, the piston being coupled to the valve stem;

wherein, in response to an input received at the input port, the piston compresses the spring and moves the valve plug between a closed position and an open position, and wherein a flow path of the split valve body includes a first flow path portion and a second flow path portion, the first flow path portion passes through the first body portion, the second flow path portion passes through the second body portion, further including a seal, the seal being disposed at an interface between the first flow path portion and the second flow path portion.

* * * * *

UNITED STATES PATENT AND TRADEMARK OFFICE
CERTIFICATE OF CORRECTION

PATENT NO. : 11,333,254 B2
APPLICATION NO. : 16/702125
DATED : May 17, 2022
INVENTOR(S) : Jacob T. R. Renollett et al.

Page 1 of 1

It is certified that error appears in the above-identified patent and that said Letters Patent is hereby corrected as shown below:

In the Claims

At Column 10, Line 45, "position" should be -- position, --.

Signed and Sealed this
Twenty-sixth Day of September, 2023

Katherine Kelly Vidal
*Director of the United States Patent and Trademark Office*